(12) United States Patent
Gilbertson et al.

(10) Patent No.: US 9,211,965 B2
(45) Date of Patent: Dec. 15, 2015

(54) PLASTIC FASTENER DISPENSING HAND TOOL HAVING A NOVEL ANVIL DESIGN

(71) Applicant: Avery Dennison Corporation, Mentor, OH (US)

(72) Inventors: Daniel Gilbertson, Millbury, MA (US); David E Herring, Shrewsbury, MA (US); Jeffrey A Raymond, Leominster, MA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/064,772

(22) Filed: Oct. 28, 2013

(65) Prior Publication Data

US 2014/0054351 A1 Feb. 27, 2014

Related U.S. Application Data

(62) Division of application No. 13/024,557, filed on Feb. 10, 2011.

(60) Provisional application No. 61/303,352, filed on Feb. 11, 2010, provisional application No. 61/373,517, filed on Aug. 13, 2010, provisional application No. 61/406,602, filed on Oct. 26, 2010.

(51) Int. Cl.
*B65C 7/00* (2006.01)
*B23P 6/00* (2006.01)

(52) U.S. Cl.
CPC . *B65C 7/005* (2013.01); *B23P 6/00* (2013.01); *B65C 7/00* (2013.01); *B65C 2201/00* (2013.01);
(Continued)

(58) Field of Classification Search
CPC ...... B65C 7/00; B65C 7/005; B65C 2201/00; B25B 31/00; B23D 6/00

USPC .................................... 227/67, 69, 71; 173/1
See application file for complete search history.

(56) References Cited

U.S. PATENT DOCUMENTS 3,734,375 A 5/1973 Bone et al.
3,924,788 A 12/1975 Furutu
(Continued)

FOREIGN PATENT DOCUMENTS

AU 19700012430 9/1971
CN 1136332 11/1996
(Continued)

OTHER PUBLICATIONS

International Search Report and Written Opinion dated Jun. 16, 2011 for International Application No. PCT/US2011/024299.
(Continued)

*Primary Examiner* — Michelle Lopez
(74) *Attorney, Agent, or Firm* — Avery Dennison Retail Information Services LLC (57) ABSTRACT

An improved hand tool for dispensing plastic fasteners having a novel anvil design. The hand tool has a gun shaped casing with a barrel portion and a handle portion. The casing has a needle assembly opening at the front of the barrel portion and a trigger slot at the front of the handle portion. The hand tool further has a hollow needle disposed on one end of a needle assembly, and a trigger that is pivotally mounted within the casing that extends out from the trigger slot. The trigger is capable of moving the needle assembly between the retracted and extended positions. The hand tool further has an anvil. The anvil has a needle guard, a main portion, and a fabric slot. The fabric slot separates the needle guard from the main portion.

14 Claims, 4 Drawing Sheets

(52) U.S. Cl.
CPC ........ *Y10T 29/4973* (2015.01); *Y10T 29/49716* (2015.01); *Y10T 29/49718* (2015.01); *Y10T 29/49833* (2015.01)

(56) References Cited

U.S. PATENT DOCUMENTS

| | | | |
|---|---|---|---|
| 4,610,384 | A | 9/1986 | Duchin et al. |
| 4,610,385 | A | 9/1986 | Duchin |
| 4,673,120 | A | 6/1987 | Strausburg |
| 4,681,248 | A | 7/1987 | Duchin |
| 5,024,365 | A | 6/1991 | Bourque |
| 5,305,939 | A | 4/1994 | Deschenes et al. |
| 5,307,975 | A | 5/1994 | Deschenes et al. |
| 5,501,002 | A | 3/1996 | Fukami |
| 5,639,006 | A | 6/1997 | Kim |
| 5,683,025 | A | 11/1997 | Grendol |
| 5,772,073 | A | 6/1998 | Deschenes |
| 5,813,589 | A | 9/1998 | Kim et al. |
| 5,950,901 | A | 9/1999 | Kubota et al. |
| 6,267,285 | B1 | 7/2001 | Raymond et al. |
| 6,533,155 | B1 | 3/2003 | Kubota et al. |
| 6,752,307 | B2 | 6/2004 | Raymond |
| 6,837,143 | B2 | 1/2005 | Inoue |
| 6,837,413 | B1 | 1/2005 | Raymond et al. |
| 7,331,497 | B2 | 2/2008 | Cooper et al. |
| 2004/0035904 | A1 | 2/2004 | Kunreuther |
| 2011/0220701 | A1 | 9/2011 | Gilbertson et al. |
| 2012/0217281 | A1 | 8/2012 | Davis et al. |

FOREIGN PATENT DOCUMENTS

| | | |
|---|---|---|
| CN | 1556763 | 12/2004 |
| CN | 1617816 | 5/2005 |
| JP | 52003397 | 1/1977 |
| JP | 60134831 | 7/1985 |
| JP | 2005510418 | 4/2005 |
| WO | 0051792 | 9/2000 |
| WO | 03045787 | 6/2003 |
| WO | 2005005265 | 1/2005 |

OTHER PUBLICATIONS

International Search Report and Written Opinion dated Jun. 16, 2011 for International Application No. PCT/US2011/024302.
International Search Report and Written Opinion dated Jun. 16, 2011 for International Application No. PCT/US2011/024304.
The State Intellectual Property Office of P.R.C. Search Report dated Nov. 25, 2013 for Chinese Application No. 2011800185125.
The State Intellectual Property Office of P.R.C. Search Report dated Nov. 25, 2013 for Chinese Application No. 2011800185021.
Japanese Patent Application No. 2012-552982 Office Action Notice of Reason(s) for Refusal dated Jul. 8, 2014.
Japanese Patent Application No. 2012-552983 Office Action Notice of Reason(s) for Refusal dated Jul. 8, 2014.

PLASTIC FASTENER DISPENSING HAND TOOL HAVING A NOVEL ANVIL DESIGN

CROSS-REFERENCE TO RELATED APPLICATIONS

The present application claims the benefit of U.S. Provisional Application Nos. 61/303,352 filed Feb. 11, 2010, 61/373,517 filed Aug. 13, 2010, and 61/406,602 filed Oct. 26, 2010, all of which are incorporated herein by reference in their entireties.

FIELD OF THE INVENTION

A hand tool for dispensing plastic fasteners and a method of using the same. More particularly, the invention relates to a hand tool for dispensing plastic fasteners for an article of clothing having a novel needle anvil that prevents inadvertent user needle sticks, and a needle used with the hand tool having a novel casing that further prevents inadvertent user needle sticks during the replacement of the needle.

BACKGROUND OF THE INVENTION

The present invention relates to a hand tool for dispensing plastic fasteners, and more particularly to a novel plastic fastener dispensing hand tool that prevents inadvertent user needle sticks by employing a unique needle anvil and a needle having a unique casing.

Plastic fasteners comprising an elongated flexible filament with a first enlargement at one end of the flexible filament and a second enlargement at the opposite end are well-known in the art and widely used in commerce. Plastic fasteners of this type are commonly used to maintain certain articles of clothing (i.e. men's dress shirts) in a folded condition so as to minimize any wrinkling of the article and so as to present the article in an otherwise flattering manner. A plastic fastener dispensing hand tool (commonly referred to as a "tagging gun") having an unexposed articulating needle is used to dispense plastic fasteners to maintain certain articles of clothing in a folded condition. Tagging guns having an unexposed articulating needle are well known, examples of such tools including those disclosed in U.S. Pat. Nos. 6,267,285, 6,837,413, and 7,331,497.

The design of known tagging guns presents several operating issues. First, the design of known tagging guns leaves a large gap between the wall of the tagging gun that the needle articulates from and the anvil into which the needle articulates. This large gap allows for the inadvertent entrance of an operator's finger or hand into the gap. This is undesirable, as the tagging gun may accidentally be actuated while the operator's finger or hand is in the gap, thereby causing the needle to articulate from the tagging gun and into the operator's hand resulting in operator injury. Second, the procedure for replacing the needle of known tagging gun designs further lends to the possibility of operator injury. To replace the needle of known tagging guns, the operator is required to grasp the needle directly. Because the needle of the tagging gun is both small and located in a tightly confined area within the tagging gun, a high level of dexterity is required to grasp the needle. An operator may find difficulty in grasping the needle, and there exists a high probability that an operator may accidentally stick himself or herself with the needle as the operator struggles to remove the needle from the tagging gun. Third, the design of known tagging guns does not permit an operator to precisely see where the needle will penetrate the article of clothing when the tagging gun is actuated. This is problematic, as the operator may secure a plastic fastener to an incorrect location on the article of clothing. The operator would then be required to carefully remove the incorrectly placed plastic fastener, taking care not to damage the article of clothing, and then place an additional plastic fastener in the correct location on the article of clothing. Such operation wastes both time and resources, and furthermore increases the likelihood that the article of clothing may become damaged.

Therefore, what is needed is an improved tagging gun that reduces the risk of operator injury while also increasing the accuracy of plastic fastener placement.

BRIEF SUMMARY OF THE INVENTION

By providing an improved hand tool for dispensing plastic fasteners having a novel protective needle anvil and a novel protective needle casing, the present invention overcomes the above-identified safety problems associated with known tagging guns. Additionally, the present invention greatly improves plastic fastener placement accuracy.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a hand tool for dispensing plastic fasteners. The hand tool has a gun shaped casing with a barrel portion and a handle portion. The casing has a needle assembly opening at the front of the barrel portion and a trigger slot at the front of the handle portion. The hand tool further has a hollow needle disposed on one end of a needle assembly. The needle assembly is slidably movable back and forth between a retracted position disposed substantially within the casing and an extend position disposed substantially out of the casing through the needle assembly opening. The hand tool further has a trigger that is pivotally mounted within the casing that extends out from the trigger slot. The trigger is capable of moving the needle assembly between the retracted and extended positions. The hand tool further has an anvil. The anvil has a needle guard, a main portion, and a fabric slot. The fabric slot separates the needle guard from the main portion.

The present invention also relates to a method of using a hand tool to dispense plastic fasteners to attach a hangtag to an article of clothing. The method includes the steps of, first, providing a hand tool having a gun shaped casing having a barrel portion and a handle portion. The casing has a needle assembly opening at the front of the barrel portion. The hand tool further has a hollow needle, a needle assembly, a trigger and an anvil. The anvil has a needle guard, a main portion, and a fabric slot. The fabric slot separates the needle guard from the main portion. Next, the method includes the step of inserting a portion of an article of clothing into the fabric slot. Then, the trigger is depressed to advance the needle assembly forward until the hollow needle pierces the article inserted into the fabric slot. The trigger is then further depressed to dispense a plastic fastener through the hollow needle into the article. The method concludes by releasing the trigger to retract the needle assembly.

The present invention also relates to a method of replacing a worn needle in a hand tool for dispensing plastic fasteners. The method includes the steps of, first, providing a hand tool having a gun shaped casing having a barrel portion and a handle portion. The casing has a needle assembly opening at the front of the barrel portion. The hand tool further has a hollow needle, a needle assembly, a trigger and an anvil. The anvil has a needle guard, a main portion, and a fabric slot separating the needle guard from the main portion. The method then includes the step of providing a replacement needle having a protective needle casing. The replacement needle has a tip, a stem, and a base portion. The needle casing has a first end, a second end, and a tubular body. The tip and the stem of the replacement needle are inserted into the first end of the casing. Next, the method includes the step of inserting the second end of the needle casing into the needle guard of the anvil. Then, the trigger is depressed to advance the needle assembly forward until the tip and stem of the hollow needle are inserted into the second end of the needle casing. Next the method includes the step of removing the needle casing from the needle guard of the anvil and releasing the trigger. Then, the first end of the needle casing is inserted into the needle guard of the anvil. Next, the trigger is depressed to advance the needle assembly forward until the replacement needle is disposed with the needle assembly. The method concludes by removing the needle casing from the needle guard and releasing the trigger.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
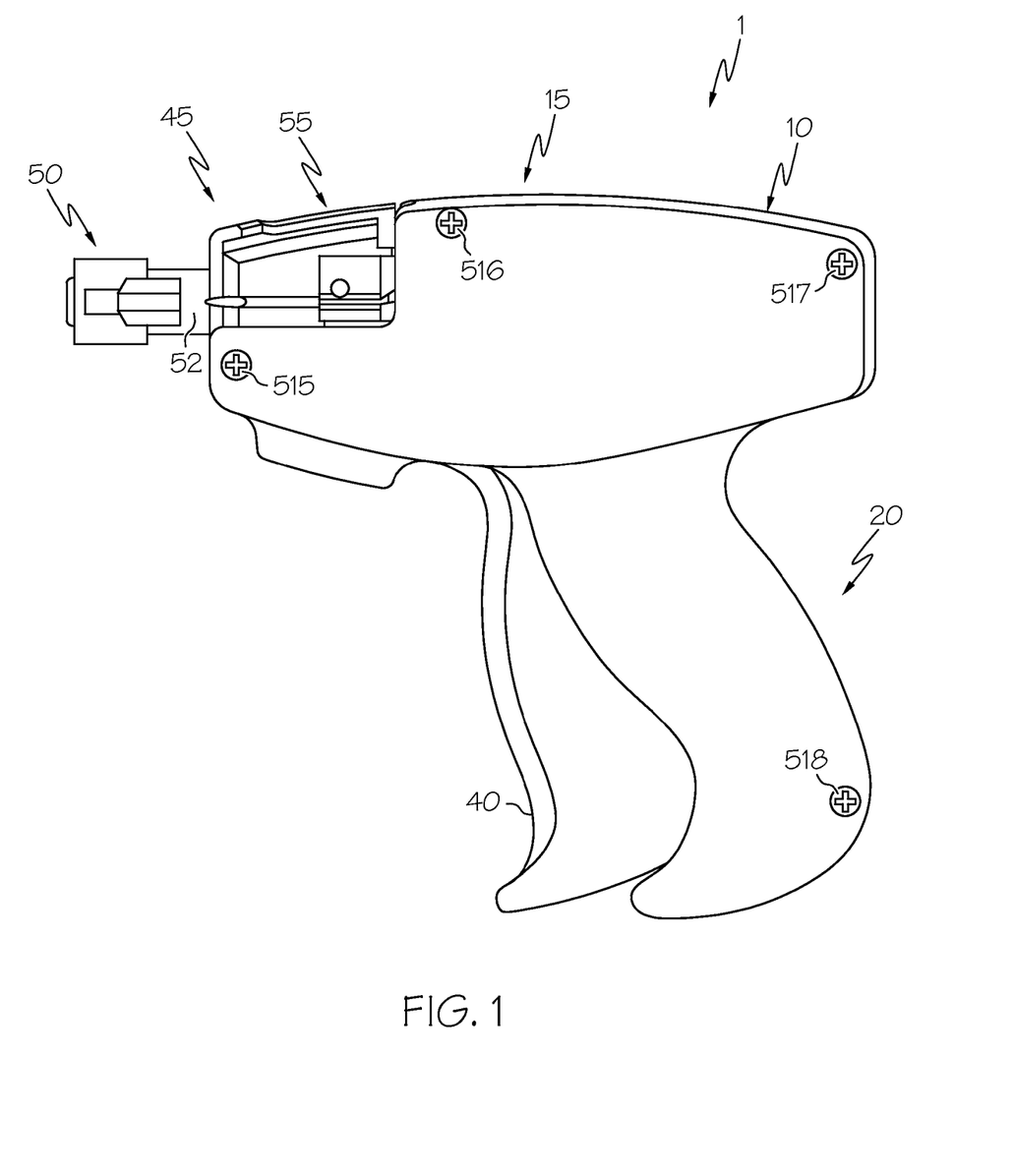
FIG. 1 is a side view of the left side of the present invention.
Figure 2:
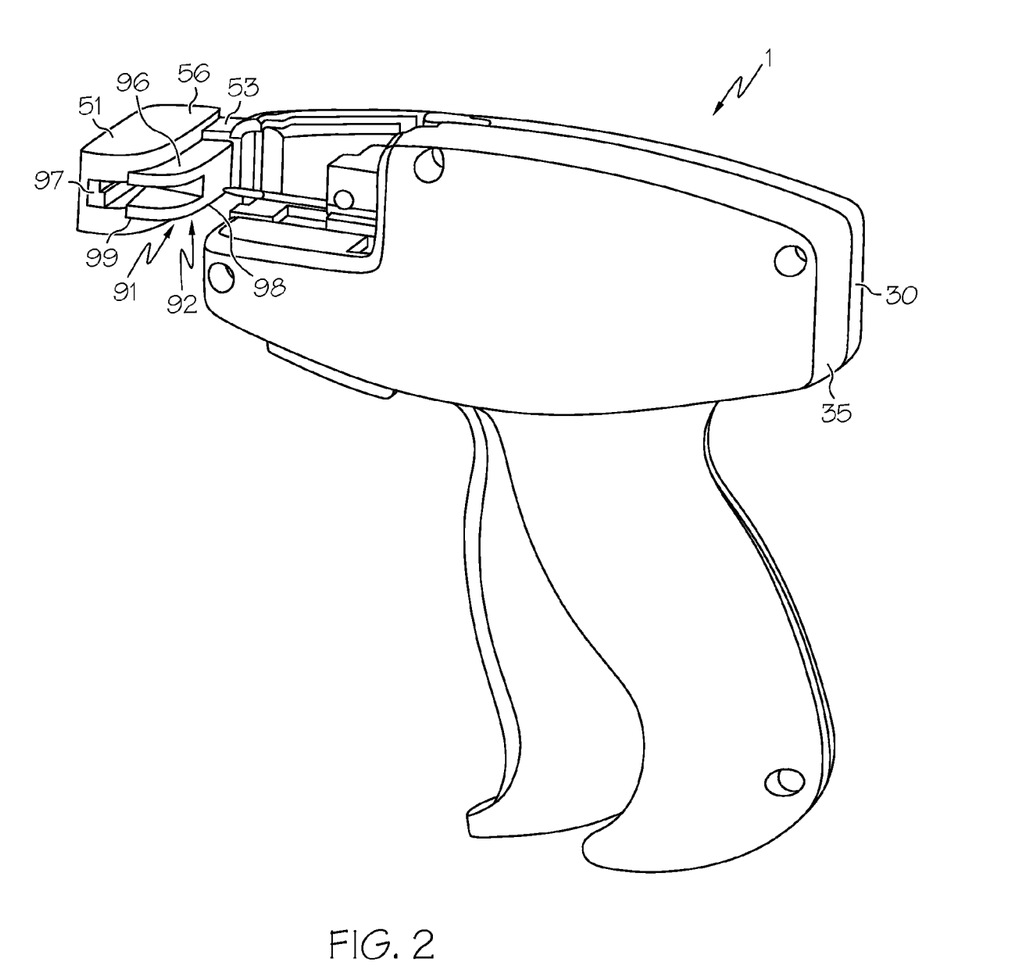
FIG. 2 is a perspective view of the rear left side of the present invention.
Figure 3:
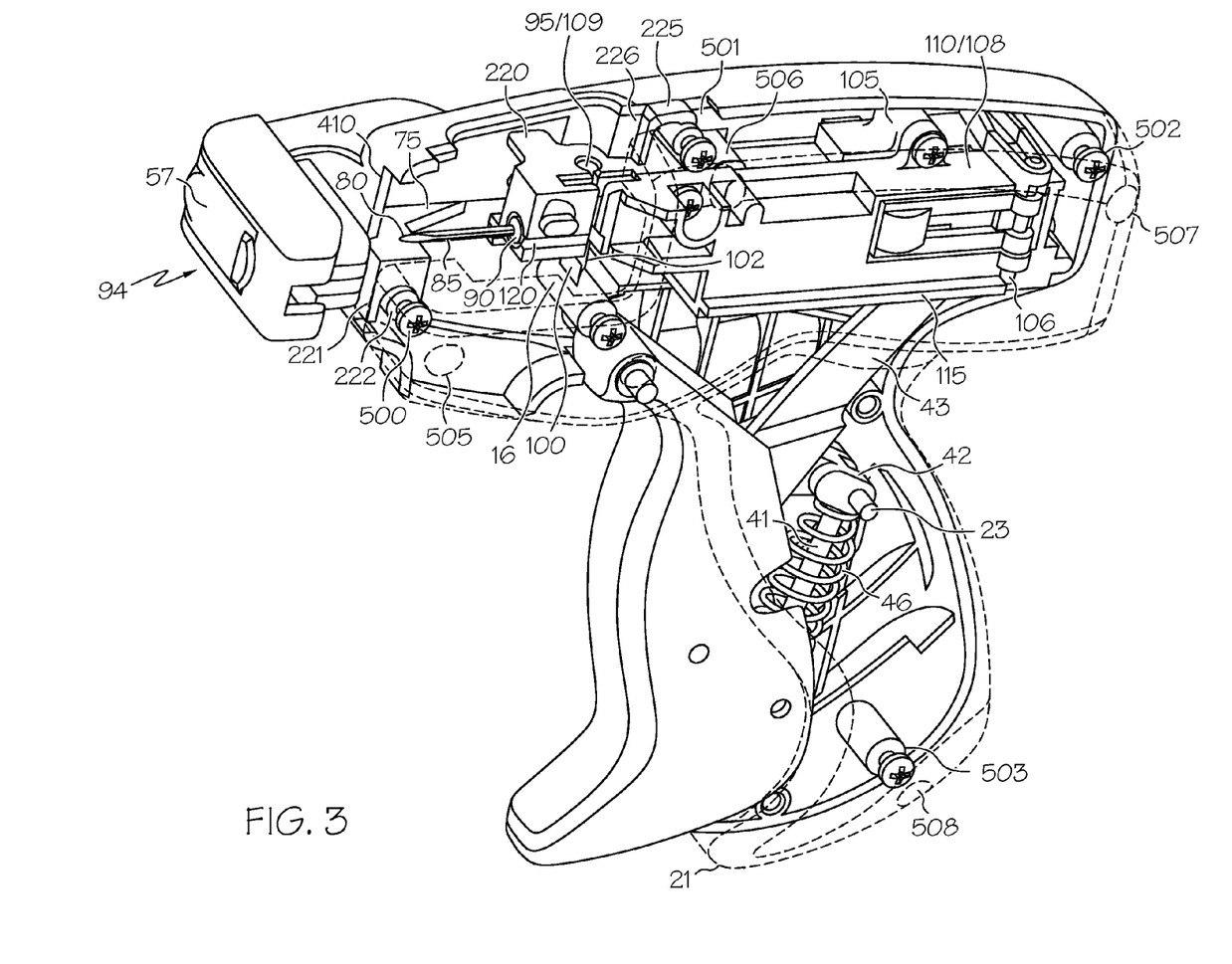
FIG. 3 is a perspective view of the front left side of the present invention with the left side of the casing of the invention shown in wire frame.

Referring now to FIGS. 1, 2, and 3 a plastic fastener dispensing hand tool 1 is shown. It should be noted that portions of the hand tool 1 not pertinent to the present invention are neither shown nor described in detail herein.

The hand tool 1 has a gun shaped casing 10. The casing 10 has a barrel portion 15 and a handle portion 20. The casing 10 is comprised of a right half 30 and a left half 35. The halves 30, 35 jointly define a needle assembly opening 16 located near the front of the barrel portion 15, and a trigger slot 21 located at the front of the handle portion 20. A plurality of four assembly posts 500, 501, 502, 503 are formed into the right half 30. The first assembly post 500 is located near the front of the barrel portion 15, the second assembly post 501 is located near the front of the needle assembly opening 16, the third assembly post 502 is located near the back of the barrel portion 15, and the fourth assembly post 503 is located near the bottom of the handle portion 20. A plurality of four assembly holes 505, 506, 507, 508 are formed on the left half 35. The four assembly holes 505, 506, 507, 508 are positioned to line up with the four assembly posts 500, 501, 502, 503 when the left half 35 and the right half 30 of the casing 10 are brought together. A plurality of four assembly screws 515, 516, 517, 518 are driven through the assembly holes 505, 506, 507, 508 and into the assembly posts 500, 501, 502, 503 to secure the left half 35 and the right half 30 of the casing 10 together.

A trigger 40 is pivotally attached to the casing 10. The trigger 40 extends though the trigger slot 21. A first trigger arm 41 extends from the bottom of the trigger 40. One end of the first trigger arm 41 is pivotally connected to the bottom of the trigger 40, while the other end of the first trigger arm 41 is pivotally anchored in the middle of the handle portion 20 at an anchor point 23. A first coil spring 46 is coiled around the first trigger arm 41. The first coil spring 46 extends from the bottom of the trigger 40 to the anchor point 23. A second trigger arm 42 connects the first trigger arm 41 to a needle assembly arm 43. One end of the second trigger arm 42 is pivotally anchored to the first anchor point 23, while the other end of the second trigger arm 42 is pivotally connected to the needle assembly arm 43.

The hand tool 1 further has an anvil 45 mounted at the front of the barrel portion 15. The anvil 45 has a needle guard 50 and a main portion 55. The needle guard 50 is connected to the main portion 55 by an anvil arm 53 that extends along the right side of both the needle guard 50 and the main portion 55. The needle guard 50 has a static portion 51 and a dynamic portion 56. The static portion 51 has a needle access door 57 that conceals a needle guard tip 94. The static portion 51 is substantially rectangular shaped, and is oriented with the needle access door 57 and the needle guard tip 94 facing away from the barrel portion 15. The dynamic portion 56 has a face 92 and a ramp 91. Likewise, the static portion 51 has a face 96 and a ramp 97. The dynamic portion 56 is mounted within the static portion 51 with the face 92 of the dynamic portion 56 facing the front of the barrel portion 15. The dynamic portion 56 is biased outwardly away from the static portion 51 by a second coil spring 93 (not shown). However, it is contemplated that the second coil spring 93 may be replaced by a leaf spring, resilient plastic tab, or any other appropriate biasing means. When the dynamic portion 56 is fully biased away from the static portion 51, the face 92 of the dynamic portion 56 is spaced a very short distance away from the end of main portion 55. With the dynamic portion 56 mounted within the static portion 51, the needle guard 50 has a circular passage 98 that extends through the needle guard tip 94 and to the face 92 of the dynamic portion 56. A needle sight channel 99 extends outwardly from the left of the circular passage 98 to the left wall of the needle guard 50. The needle sight channel 99 provides visual access to the circular passage 98.

A fabric slot 52 separates the needle guard 50 from the main portion 55. The fabric slot 52 extends substantially perpendicular to the length of the anvil 45, and except for the anvil arm 53, extends the entire width of the anvil 45. The main portion 55 is provided with a limiter wall 410 that extends upwardly from the front of the main portion 55, and a first anvil tab 221 that extends downwardly from the front of the main portion 55. The first anvil tab 221 is substantially square shaped and has a U-shaped channel 222. A second anvil tab 225 is provided toward the rear of the main portion 55. The second anvil tab 225 consists of a U-shaped channel 226 integrally formed into the right wall of the main portion 55.

The first anvil tab 221 and the second anvil tab 225 cooperate with the first assembly post 500 and the second assembly post 501 to secure the anvil 45 to the front of the barrel portion 15. The U-shaped channel 222 of the first anvil tab 221 engages the first assembly post 500, while the U-shaped channel 226 of the second anvil tab 225 engages the second assembly post 501. As the assembly screws 505, 506, 507, 508 are driven through the assembly holes and into the assembly posts 500, 501, 502, 503 to secure the right half 30 and the left half 35 of the casing 10 together, the right half 30 and the left half 35 of the casing 10 begin to exert force onto the first and second anvil tabs 221, 225 that extend between the right half 30 and the left half 35 of the casing 10. Once the assembly screws 505, 506, 507, 508 are fully tightened and the right half 30 and the left half 35 of the casing 10 are tightly secured together, the force created by the right half 30 and the left half 35 of the casing 10 on the first and second anvil tabs 221, 225 further assists the first and second anvil tab U-shaped channels 222, 226 in securing the anvil 45 to the front of the barrel portion 15 of the hand tool 1.

The hand tool 1 further has a hollow needle 75. The needle 75 has a tip 80, a stem portion 85, and a base portion 90. The base portion 90 is mounted inside a needle slide 95. A limiter 220 extends from the top front edge of the needle slide 95. The base portion 90 is secured to the needle slide 95 by a needle lock 100. The needle lock 100 has a threaded portion 101 (not shown) and a slotted end 102. The threaded portion 101 is driven into a needle lock opening 103. The needle lock opening 103 intersects part of the base portion 90 when the needle 75 is mounted inside the needle slide 95. The base portion 90 has a needle lock channel 104 (not shown) that lines up with the needle lock opening 103 when the needle 75 is mounted to the needle slide 95. The needle lock channel 104 receives the needle lock 100 when the needle lock 100 is completely driven into the needle lock opening 103, thereby locking the hollow needle 75 to the needle slide 95.

A needle slide cover 110 is attached to the needle slide 95. The needle assembly arm 43 extends downwardly from the bottom of the needle slide cover 110. Together, the needle slide 95 and the needle slide cover 110 form a needle assembly 105. When the needle slide 95 and the needle slide cover 110 are secured to one another to form the needle assembly 105, the needle slide cover 110 constitutes a left needle assembly 108, while the needle slide 95 constitutes a right needle assembly 109. A first ridge 106 extends lengthwise along the bottom edge of the left needle assembly 108, and a second ridge 107 (not shown) extends lengthwise along the bottom edge of the right needle assembly 109. A first channel 115 is formed on the interior of the barrel portion 15 of the left half 35. A second channel 120 is formed on the interior of the barrel portion 15 of the right half 30. The first and second channels 115, 120 extend substantially parallel from the front to the rear of the barrel portion 15. The first and second channels 115, 120 cooperate with the first and second ridges 106, 107 to slidably secure the needle assembly 105 within the barrel portion 15 and limit the needle assembly 105 to movement lengthwise within the barrel portion 15.

Figure 4:
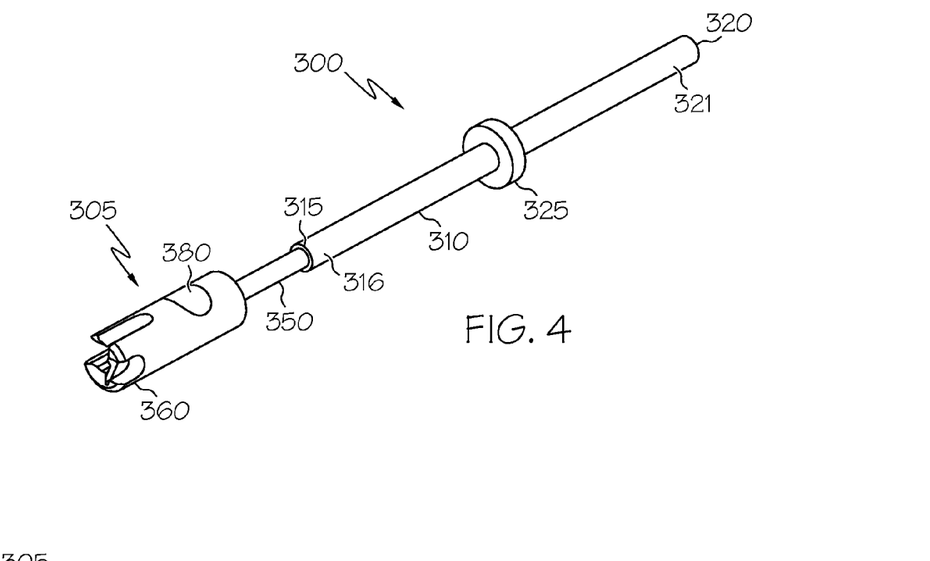
FIG. 4 is a perspective view of the front left side of a replacement needle and a needle casing used with the hand tool of the present invention.

Referring now to FIG. 4, a replacement needle 305 is shown inserted into a needle casing 300. The needle casing 300 has a substantially cylindrical shaped body 310 with a first opening 315 at a first end 316 of the body 310, and a second opening 320 at a second end 321 of the body 310. The cylindrical shaped body 310 has a diameter slightly larger than that of the circular passage 98 of the needle guard 50. The openings 315, 320 have a diameter slightly smaller than that of the replacement needle 305. Therefore, an interference fit is created between the first opening 315 and the replacement needle 305 when the replacement needle 305 is fully inserted into the first opening 315. This interference fit causes the replacement needle 305 to be retained within the first opening 315.

A limiting ridge 325 is provided on the middle of the protective casing 300. The limiting ridge 325 facilitates the replacement of the hand tool 1 needle 75 while also assisting in the manipulation of the needle casing 300 by an operator of the hand tool 1. The replacement needle 305 has a tip 340 (not shown) a stem portion 350 and a base portion 360. The base portion 360 has a needle lock channel 380.

With reference now directed back to FIGS. 1, 2, and 3, it will be explained how the hand tool for dispensing plastic fasteners 1 is used to maintain an article of clothing in a predetermined arrangement, such as a folded condition. For the purposes of this discussion, it will be assumed that the article to be maintained in a particular condition or arrangement is a men's dress shirt (not shown). It should be noted that operations of the hand tool not pertinent to the present invention are not described in detail herein.

To begin the operation, the operator first inserts a portion of the shirt into the fabric slot 52. Both the ramp 97 of the static portion 51 and the ramp 91 of the dynamic portion 56 help to guide the shirt into the fabric slot 52. As described above, when the dynamic portion 56 is fully biased away from the static portion 51, the face 92 of the dynamic portion 56 is spaced a very short distance away from the end of the main portion 55. This design prevents the fingers or hands of an operator from inadvertently entering into the space of the fabric slot 52. However, when the dynamic portion 56 is fully biased away from the static portion 51, the width of the fabric slot 52 will be less than that of the thickness of the men's dress shirt. Therefore, as the shirt is inserted into the fabric slot 52, the shirt will come into contact with the ramp 91 and the face 58 of the dynamic portion 56, thereby causing the dynamic portion 56 to retract into the static portion 51. It should be noted that the dynamic portion 56 does not fully retract into the static portion 51 as soon as the dress shirt is inserted into the fabric slot 52. Rather, the dynamic portion 56 will only retract whatever amount is necessary to accommodate the dress shirt in the fabric slot 52. Therefore, the face 92 of the dynamic portion 56 will always remain in contact with the dress shirt when the dress shirt is positioned in the fabric slot 52. This further prevents the fingers or hands of an operator from inadvertently entering into the fabric slot 52 and prevents operator injury.

While the design of the anvil 45 can advantageously protect against worker injury, the design can also limit the types of clothes that can be used with the hand tool 1. As stated above, the dynamic portion 56 retracts into the static portion 51 when a article of clothing is inserted into the fabric slot 52. However, the dimensions of the static portion 51 limit the distance that the dynamic portion 56 can retract. The dynamic portion 56 will be unable to retract any further into the static portion once the face 92 of the dynamic portion 56 is level with the face 96 of the static portion 51. The maximum thickness of an article of clothing that can be used with the hand tool 1 is dictated by the width of the fabric slot 52 with the dynamic portion 56 full retracted into the static portion 51. If the thickness of the article of clothing exceeds the width of the fabric slot 52 with the dynamic portion fully retracted, the hand tool 1 will be unable to secure a plastic fastener through the article of clothing, as the article of clothing will not be able to fit into the fabric slot 52. Clothing made out of a thicker material (i.e. denim jeans) will be considerable thicker than clothing made out of a thinner material (i.e. cotton t-shirt). Therefore, it is contemplated that the hand tool 1 may be provided with a plurality of anvils 45, with each anvil 45 being adapted for use with fabrics having a specified thickness range.

To exchange the anvil 45, the operator first loosens, but does not remove, the four assembly screws 515, 516, 517 518. This allows the left half 35 and the right half 30 of the casing 10 to slightly be pulled apart from one another. As noted above, the right half 30 and the left half 35 of the casing 10 exert a force on the first and second anvil tabs 221, 225 that extend between the right half 30 and the left 35 of the casing 10 to assist in securing the anvil 45 to the front of the barrel portion 15. Loosening the assembly screws 515, 516, 517, 518 removes this force and allows the anvil 45 to be removed from the hand tool 1. With the assembly screws loosened 506, 507, 508, 509, the operator may now remove the anvil 45 from the hand tool 1. To install the new anvil 45, the operator must first align the first and second anvil tabs 221, 225 with the first and second assembly posts 500, 501. The operator then lowers the anvil 45 into the front of the barrel portion 15 so that the U-shaped channel 222 of the first anvil tab 221 engages the first assembly post 500, while the U-shaped channel 226 of the second tab 225 engages the second assembly post 501. The operator completes the anvil exchange process by tightening the assembly screws 516, 517, 518, 519, thereby firmly securing the anvil 45 to the hand tool 1 while also securing the right half 30 and the left half 35 of the casing 10 back together.

Focusing again on the process of using the hand tool 1 to dispense a plastic fastener, with the dress shirt now inserted into the fabric slot 52, the operator next depresses the trigger 40 to actuate the hand tool 1, thereby causing the trigger 40 to retract into the trigger slot 21. The retraction of the trigger 40 into the trigger slot 21 causes the first trigger arm 41 to rotate clockwise about the anchor 23, thereby causing the second trigger arm 42 to also rotate clockwise about the anchor 23. The rotation of the second trigger arm 42 causes the needle assembly arm 43 to pivot away from the back of the handle portion 20 and toward the front of the barrel portion 15. Because the needle assembly arm 43 is connected to the needle assembly 105, this movement of the needle assembly arm 43 causes the needle assembly 105 to move toward the front of the barrel portion 15. The needle assembly 105 continues to move forward until the limiter 220 on the needle slide 95 makes contact with the limiter wall 410 of the anvil 45, thereby preventing the needle assembly 105 from further advancing to the front of the barrel portion 15. As the needle assembly 105 is advanced to the front of the barrel portion 15, the hollow needle 75 mounted to the needle assembly 105 is likewise advanced. As the hollow needle 75 is advanced, the tip 80 pierces the dress shirt inserted into the fabric slot 52 and travels through the circular passage 98 towards the needle guard tip 94. Once the limiter 220 makes contact with the limiter wall 410, the tip 80 is nearly contiguous with the needle access door 57. Further depression of the trigger 40 by the operator causes a plastic fastener to be dispensed through the sharpened tip 80 of the hollow needle 75, thereby securing the shirt together such as to maintain the dress shirt in a folded or other predetermined condition.

It should be noted that the needle sight channel 99 aids in the accurate placement of plastic fasteners. The needle sight channel 99 provides visual access to the circular passage 98. The circular passage 98 is located on the same plane as that traveled by the needle 75 when the hand tool 1 is actuated. With the shirt inserted into the fabric slot 52, the operator can easily see both the needle 75 and, because of the needle sight channel 99, the circular passage 98. Because the needle 75 travels into the circular passage 98, and because the needle sight channel 99 provides visual access to the circular passage 98, the operator can predict with a high level of accuracy where the needle 75 will pierce the article of clothing once the hand tool 1 is actuated. Therefore, the operator will be able to accurately determine where the hand tool 1 will secure the plastic fastener on the article of clothing.

Focusing again on the operation of the hand tool 1, once the plastic fastener is dispensed from the hand tool 1, the operator can release the trigger 40. The needle assembly 95 is under a rearward bias that causes the needle assembly 95 to retreat toward the back of the barrel portion 15 once the trigger is released 21. The movement of the needle assembly 95 to the rear of the barrel portion 15 will also cause the trigger 40 to extend from the trigger slot 21. As the needle assembly 95 returns to the back of the barrel portion 15, the needle 75 likewise is retracted away from the needle access door 57 and out of the circular passage 98 and the dress shirt inserted into the fabric slot 52. With the needle 75 and needle assembly 95 retracted, the operator can then remove the dress shirt from the fabric slot 52 and reposition the dress shirt back into the fabric slot 52 to secure an additional plastic fastener at a different location on the shirt, or insert a new shirt into the fabric slot 52.

Figure 5:
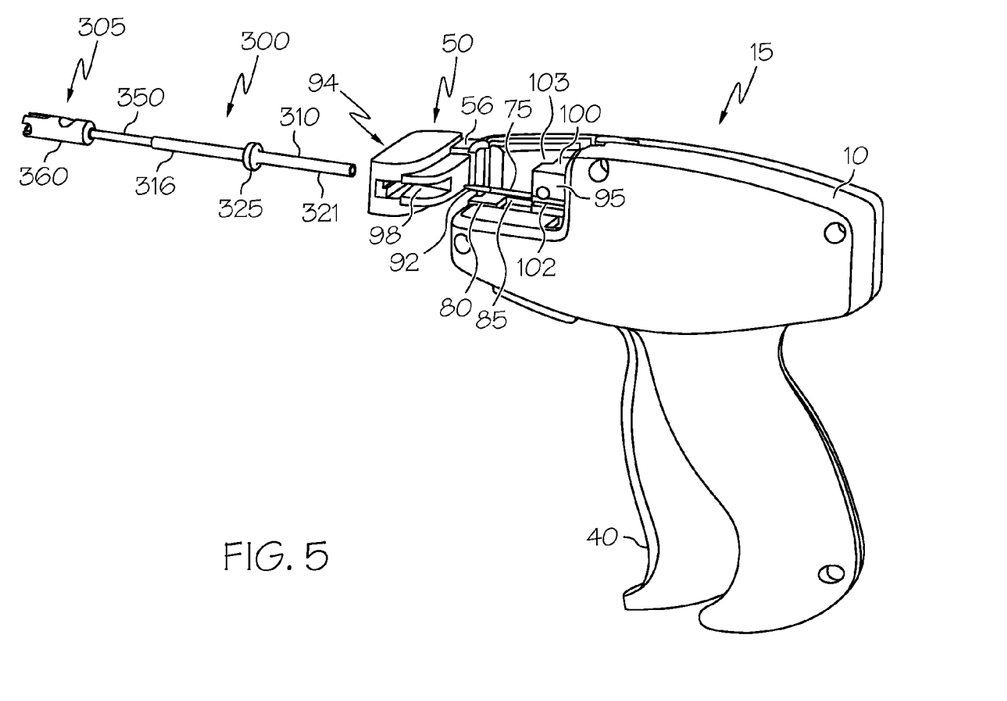
FIG. 5 is a perspective view of the rear left side of the present invention showing the process of using the needle casing to remove a worn needle from the hand tool.

Now directing attention towards FIGS. 4 and 5, it will now be explained how the needle casing 300 is used to replace a worn needle with a new needle. FIG. 4 depicts how the replacement needle 305 for the hand tool 1 is shipped. The replacement needle 305 is shipped with the tip 340 and part of the stem portion 350 of the needle 305 firmly inserted into the first opening 315 of the needle casing 300. Shipping the replacement needle 305 with the casing 300 already installed serves two purposes. First, it protects any person who comes in contact with the replacement needle 305 during the shipment or storage of the replacement needle 305 from accidental needle sticks. Second, it protects the tip 340 of the replacement needle 305 from becoming dulled, and further protects the stem 350 of the needle 305 from bending or breaking.

To begin the replacement of a worn needle, the operator first slides the needle access door 57 open to reveal the needle guard tip 94 and the circular passage 98. Next, the operator inserts the second end 321 of the needle casing 300 into the guard tip 94 and into the circular passage 98. The operator then pushes the needle casing 300 into the needle guard 50 toward the face 92 of the dynamic portion 56 until the limiting ridge 325 makes contact with the tip 94 of the needle guard 50, thus preventing the needle casing 300 from further being inserted into the circular passage 98. As described above, the diameter of the cylindrical shaped body 310 of the needle casing 300 is slightly larger than that of the circular passage 98 of the needle guard 50. Therefore, once the needle casing 300 has been inserted and pushed into the tip 94 of the needle guard 50, the operator may release the needle casing 300 and the needle casing 300 will remain disposed within the needle guard 50 as a result of the interference fit created between the body 310 of the needle casing 300 and the circular passage 98. Next, to continue with the replacement of the worn needle, the operator removes the needle lock 100 from the needle lock opening 103 by inserting a tool into the slotted end 102 of the needle lock and rotating the needle lock 100 counterclockwise. Once the needle lock 100 has been removed from the needle lock opening 103, the base portion 90 is no longer secured within the needle slide 95, and thus the hollow needle 75 is free to be removed from the hand tool 1. With the limiting ridge in contact with the tip 94 of the needle guard 50, the tip 80 of the hollow needle 75 is partially inserted into the second opening 320 of the needle casing 300. However, because the stem portion 85 of the needle 75 is not yet inserted into the second opening 320, an interference fit between the needle 75 and the needle casing 300 has not yet been established, and thus the needle casing 300 cannot yet be used to remove the needle 75 from the hand tool 1.

To create the necessary interference fit, the operator must first grasp the needle casing 300 and push the needle casing 300 into the needle guard 50 and toward the face 92 of the dynamic portion 56 to ensure that the limiting ridge 325 remains in firm contact with the tip 94 of the needle guard 50. Although, as described above, the needle casing 300 is held in place in the circular passage 98 of the needle guard 50 as a result of the interference fit between the needle casing 300 and the circular passage 98, the operator must still provide additional support to the needle casing 300 during this step of the needle replacement process. With the limiting ridge 325 pressed firmly against the tip 94 of the needle guard 50, the operator can then depress the trigger 40. As explained above, depression of the trigger 40 causes the needle assembly 105 to move toward the front of the barrel portion 15. This movement of the needle assembly 105 causes the tip 80 of the needle 75 to be forced further into the second opening 320 such that the stem 85 is also forced into the second opening 320 thereby creating the desired interference fit between the stem 85 of the needle 75 and the needle casing 300. With the needle 75 now securely held in the second opening 320 of the needle casing 300, the operator can remove the second end 321 of the body 310 from the circular passage 98 of the needle guard 50 to remove the needle 75 from the hand tool 1.

Next, the operator flips the casing 300 to orient the first end 316 of the needle casing 300 toward the tip 94 of the needle guard 50. Similar to the process described above with regard to the second end 321, the operator inserts the first end 316 of the needle casing 300 into the tip 94 of the needle guard 50 and pushes the needle casing 300 toward the face 92 of the dynamic portion 56 until the limiting ridge 325 makes contact with the tip 94 of the needle guard 50. This positions the base 360 of the replacement needle 305 directly in front of the needle slide 95. However, with the trigger 40 no longer depressed, the needle slide 95 will be spaced apart from the base 360 of the replacement needle 305. Therefore, the operator must depress the trigger 40 to cause the needle assembly 105 to move forward to bring the needle slide 95 in contact with the base 360 of the replacement needle 305. With the trigger 40 still depressed and the base 360 of the replacement needle 305 resting within the needle slide 95, the operator can place the needle lock 100 back into the needle lock opening 103 by inserting a tool into the slotted end 102 of the needle lock 100 and rotating the needle lock 100 clockwise. Once the needle lock 100 is securely disposed within the needle lock opening 103, the base 360 of the replacement needle 305 is secured to the hand tool 1. However, the force of the interference fit between the stem 350 of the replacement needle 305 and the first opening 315 of the needle casing 300 is stronger than the force of the rearward bias of the needle assembly 105. Therefore, the operator must remove the needle casing 300 from the circular passage 98 of the anvil 45 to free the replacement needle 305 from the needle casing 300. The needle assembly 105 is then free to return to the rear of the barrel portion 15 of the casing 10 once the needle casing 300 has been removed. The operator can then close the needle access door 57, and the hand tool 1 is ready for further use with the replacement needle 305 installed It will thus be seen that a novel plastic fastener dispensing hand tool has been described. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method for replacing a needle of a hand tool for dispensing plastic fasteners comprising the steps of:
   providing a hand tool having a gun shaped casing having a barrel portion, and a handle portion, said casing having a needle assembly opening at the front of the barrel portion, a hollow needle, said needle having a tip, a stem and a base portion, a needle assembly, a trigger, and an anvil, said anvil having needle guard, a main portion, and a fabric slot, said fabric slot separating said needle guard from said main portion;
   providing a replacement needle having a protective needle casing, said replacement needle having a tip, a stem, and a base portion, said protective needle casing having a first end, a second end, and a tubular body, said tip of said stem of said replacement needle being inserted into said first end of said protective needle casing;
   inserting said second end of said protective needle casing into said needle guard of said anvil;
   depressing said trigger to advance said needle assembly forward until said tip and said stem of said hollow needle is inserted into said second end;
   removing said protective needle casing from a finger guide portion of said anvil; and
   releasing said trigger.

2. The method for replacing a needle of a hand tool for dispensing plastic fasteners as recited in claim 1, wherein said hand tool further has a needle lock.

3. The method for replacing a needle of a hand tool for dispensing plastic fasteners as recited in claim 2, further having the step of unlocking said needle lock after the step of inserting said second end of said protective needle casing into said finger guide portion of said anvil.

4. The method for replacing a needle of a hand tool for dispensing plastic fasteners as recited in claim 2, further having the step of locking said needle lock after the step depressing said trigger to advance said needle assembly forward until said base of said replacement needle is disposed within said needle assembly.

5. The method for replacing a needle of a hand tool for dispensing plastic fasteners as recited in claim 1, wherein the trigger is pivotally attached to the gun shaped casing and the trigger extends through a trigger slot.

6. The method for replacing a needle of a hand tool for dispensing plastic fasteners as recited in claim 1, wherein the trigger has a first trigger arm and a second trigger arm.

7. The method for replacing a needle of a hand tool for dispensing plastic fasteners as recited in claim 6, wherein the first trigger arm extends from the bottom of the trigger and one end of the first trigger arm is pivotally connected to a bottom of the trigger, while another end of the first trigger arm is pivotally anchored in a middle of a handle of the trigger.

8. The method for replacing a needle of a hand tool for dispensing plastic fasteners as recited in claim 6, wherein one end of the second trigger arm is pivotally anchored to a first anchor part, with another end of the second trigger arm is pivotally connected to a needle assembly arm.

9. The method for replacing a needle of a hand tool for dispensing plastic fasteners as recited in claim 8, wherein the static portion that has a needle access door that conceals a needle guard tip.

10. The method for replacing a needle of a hand tool for dispensing plastic fasteners as recited in claim 8, wherein the dynamic portion has a face and a ramp and is mounted within the static portion.

11. The method for replacing a needle of a hand tool for dispensing plastic fasteners as recited in claim 1, wherein the needle guard has a static portion and a dynamic portion.

12. The method for replacing a needle of a hand tool for dispensing plastic fasteners as recited in claim 1, wherein the fabric slot extends substantially perpendicular to a length of the anvil.

13. The method for replacing a needle of a hand tool for dispensing plastic fasteners as recited in claim 1, wherein a limiting ridge is provided on the protective casing.

14. The method of claim 1, further comprising sliding open a needles access door to reveal a needle guard tip prior to inserting the second end of the protective needle casing into the needle guard of the anvil.

\* \* \* \* \*